United States Patent [19]

Maule

[11] Patent Number: 5,328,233
[45] Date of Patent: Jul. 12, 1994

[54] COMBINATION CHILD'S SEAT AND ARMREST FOR A VEHICLE

[76] Inventor: Warren E. Maule, 345 Ford Ave., Highland Park, Mich. 48203

[21] Appl. No.: 970,968

[22] Filed: Nov. 3, 1992

Related U.S. Application Data

[63] Continuation of Ser. No. 715,503, Jun. 14, 1991, abandoned.

[51] Int. Cl.⁵ ............................................. A47C 13/00
[52] U.S. Cl. ..................................... 297/115; 297/238
[58] Field of Search .............. 297/112, 113, 115, 250, 297/238, 232, 14, 191, 194, 230.1, 230.13, 230.14, 250.1, 251

[56] References Cited

U.S. PATENT DOCUMENTS

| | | | |
|---|---|---|---|
| 1,835,947 | 12/1931 | Johannsen | 297/113 |
| 1,965,048 | 7/1934 | Morris | 297/238 |
| 2,584,481 | 2/1952 | Mast et al. | 297/115 |
| 3,951,448 | 4/1976 | Hawie | 297/113 |
| 4,190,288 | 2/1980 | Korger | 297/488 |
| 4,441,221 | 4/1984 | Enste et al. | 297/464 X |
| 4,540,216 | 9/1985 | Hassel, Sr. | 297/238 |
| 4,722,568 | 2/1988 | Irvin | 297/112 X |
| 4,749,229 | 6/1988 | Dorto | 297/113 X |
| 4,900,086 | 2/1990 | Steward | 297/112 X |
| 4,900,087 | 2/1990 | Crisp | 297/112 X |
| 4,913,498 | 3/1990 | Forlivio | 297/488 |
| 4,943,112 | 7/1990 | Law | 297/112 X |
| 4,986,600 | 1/1991 | Leblanc et al. | 297/112 X |
| 5,026,118 | 6/1991 | Vander Stel et al. | 297/488 X |

FOREIGN PATENT DOCUMENTS

| | | | |
|---|---|---|---|
| 0258194 | 3/1988 | European Pat. Off. | 297/238 |
| 0348374 | 12/1989 | European Pat. Off. | 297/238 |
| 2551843 | 3/1977 | Fed. Rep. of Germany | 297/488 |
| 2803574 | 8/1979 | Fed. Rep. of Germany | 297/488 |
| 2825329 | 12/1979 | Fed. Rep. of Germany | 297/238 |
| 3018019 | 11/1981 | Fed. Rep. of Germany | 297/113 |
| 3020212 | 12/1981 | Fed. Rep. of Germany | 297/488 |
| 2615799 | 12/1988 | France | 297/115 |

*Primary Examiner*—Kenneth J. Dorner
*Assistant Examiner*—Milton Nelson, Jr.
*Attorney, Agent, or Firm*—Gifford, Groh, Sprinkle, Patmore and Anderson

[57] ABSTRACT

A combination child's seat and armrest assembly includes an upper portion and a lower portion. The portions are pivotably attached to each other at the front of the assembly, thereby providing for the raising and lowering of the upper portion. In its lowered position, the assembly functions as an armrest for the driver and passenger. In its raised position, a child may be seated facing front, or the bottom side of the raised upper portion. This positioning securely fits the child between the raised upper portion and the seat back of the vehicle's seat. A bed telescoping between the rear seat and the front seat may also be provided.

10 Claims, 4 Drawing Sheets

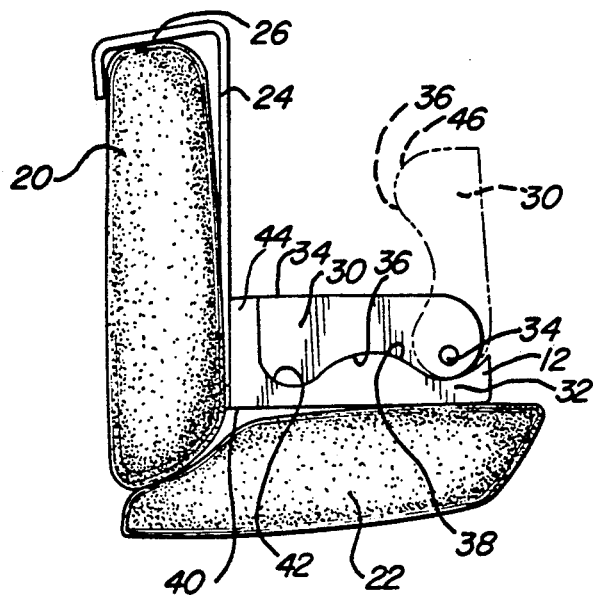
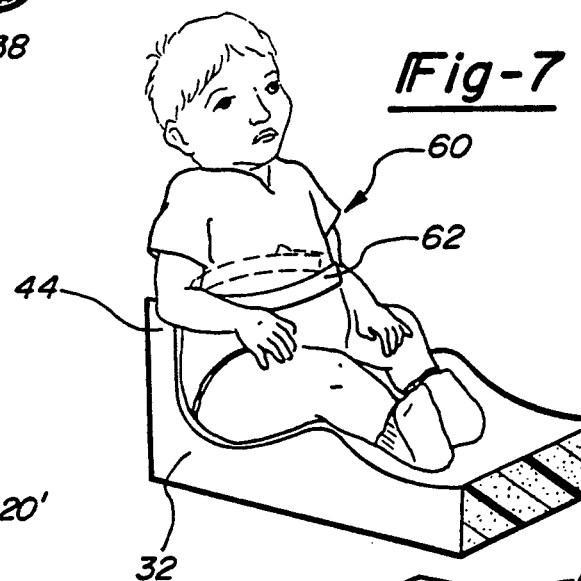
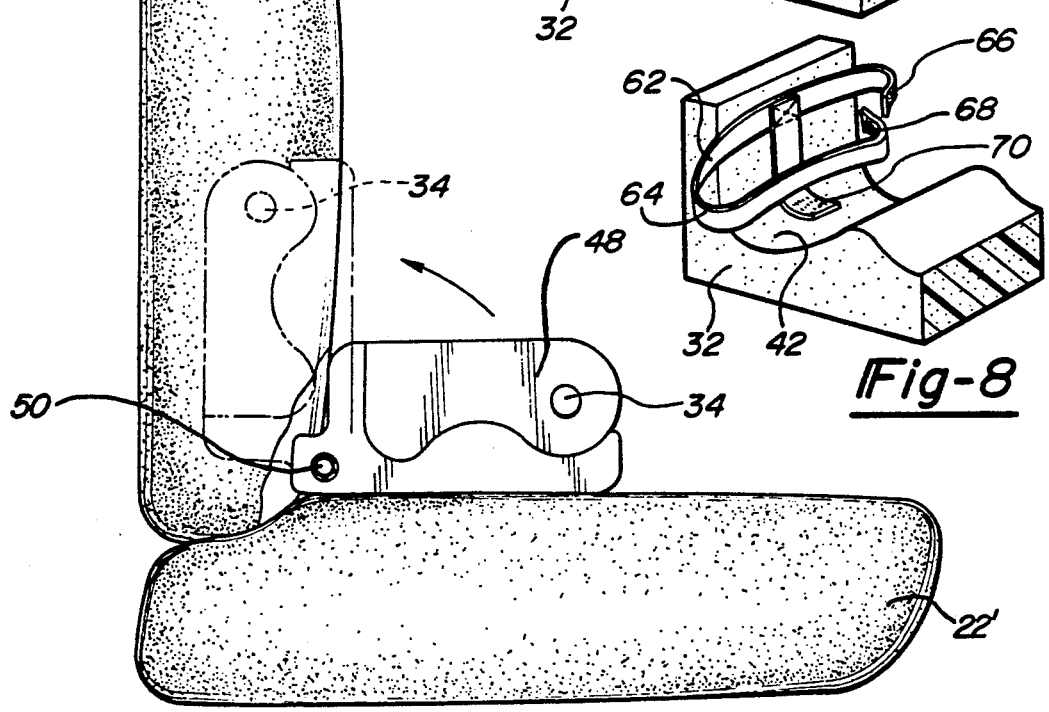

COMBINATION CHILD'S SEAT AND ARMREST FOR A VEHICLE

This is a continuation of copending application Ser. No. 07/715,503 filed on Jun. 14, 1991 and now abandoned.

BACKGROUND OF THE INVENTION

I. Field of the Invention

The present invention relates generally to a combination child's seat and armrest assembly for a vehicle. More particularly, the present invention relates to such a combination that is reversibly moveable from one of a folded position serving as an armrest to a raised position whereby a child may be seated in the assembly. A bed telescoping between the rear seat and the front may also be provided.

II. Description of the Relevant Art

Of increased concern for parents of young children over the last decade has been the application and use of seats for children in motor vehicles. This concern is based on the well-known fact that if small children are not buckled in place in a moving vehicle, particularly in an automobile, this situation presents a potentially lethal accident. Particularly, an unrestrained child acts like a free-moving missile if the car is impacted by another vehicle or if the vehicle strikes a standing object in an accident.

Acknowledging the existence of this problem, many states have enacted laws which require that children of certain ages be buckled into conventional seat belts presently provided in all automobiles.

However, such passenger restraint systems are directed at adults, and while they may have application for use to some extent with older children, conventional seat belts are not practically useable for very small children and infants.

Accordingly, between the time shortly after birth and the time when the child is physically developed enough to be seated and restrained with an adult-sized restraint system, the method of restraining a child must be modified.

Presently it is known to restrain small children and infants into a car seat specifically designed for such passengers. The car seat is a semi-portable chair which preferably has its own built in seat belt. The semi-portable chair is conventionally positioned in the front seat of an automobile or in the back seat thereof and the provided seat belt is strapped about or through the frame of the car seat. In this manner, the seat is held in place by the conventional restraint system of the automobile, just as an individual would be held therein. A small child or infant passenger is himself strapped into the child's seat. Conventionally, the child has its back to the direction of travel, and faces the rear window. This arrangement provides for maximum support of the child's as-yet still weak neck and related musculature.

This known system suffers from several disadvantages. First, and foremost, the utilization of a car seat is extremely inconvenient because it requires the parents to install and remove the car seat virtually every time a trip is taken. Furthermore, because the contours of many car seats differ from each other, fitting a car seat, which is of supposedly universal design, to the variety of present car seats is very difficult.

Second, and related to the first problem, because of the inconvenience of having to manipulate the car seat, many times parents of young children do not trouble themselves with the installation of the car seat, particularly when they are in a hurry. This results in children often being transported in a vehicle without proper restraint.

Third, such car seats are remarkably expensive and for many people do not provide an affordable option.

Fourth, many times the parents of small children fail to improperly situate the child's car seat, thus compounding the problem in the event of an accident whereupon the seat, with a child strapped therein, is itself potentially a missile-like object.

Accordingly, the prior approaches is to solving the problem of providing convenient and efficient means of holding a small child or infant in place within the seat of a automobile or similar vehicle have failed to eliminate the inconvenience and ineffectiveness of known seating systems.

SUMMARY OF THE PRESENT INVENTION

The present invention provides a combination child's seat and armrest for placement in either the front or rear seat of a conventional automobile or similar vehicle. The child's seat and armrest assembly includes an upper portion and a lower portion. The portions are pivotally attached to each other at the front part of the assembly. This construction provides for the upper portion of the assembly to be raised to a position approximately perpendicular to that of the base of the seats to which it is attached. In this position, the assembly forms a small seat whereby the upper portion, now raised, provides a place upon which the child's chest may be supported and prevented from moving forward in the event of an accident.

The lower portion of the assembly has defined therein a recession which provides a comfortable seat for the child. At the back of the lower portion (relative to the seat back of the adult seat) is provided an elevated portion which offers the child passenger back support.

The contour of the lower portion and the upper portion are mirror images of each other. Thusly, when the upper portion is returned to its lowered position, the upper side of the upper portion functions as an armrest which may be used when the child passenger is not being transported by the vehicle. The upper side of the lower portion and the lower side of the upper portion are contoured so that the two sides substantially mate with one another when the upper portion is placed in its lowered position.

The combination child's seat and armrest assembly according to the present invention is composed of a sturdy internal frame and a padded exterior. This construction provides for the proper support and pivoting characteristics of the assembly while concurrently providing a comfortable and safe environment for the child passenger.

Seat belts or harnesses may be provided strategically about the assembly to provide the maximum protection and security for the child passenger.

According to the present invention, the child preferably is situated so that it faces forward, or in the direction of travel. However, as an alternative, the assembly may be constructed with minor modification to provide for the child facing backward, whereby the raised upper portion would serve as back support for the child rather than chest support as suggested according to the above-mentioned embodiment.

Naturally, the present invention may be situated in either the front seat of the vehicle or in the back seat, and further, may be provided in pairs whereby two small children may be carried in a similar manner.

The combination child's seat and armrest assembly according to the present invention may be provided as an after-market item attachable to an automobile or may be provided as a standard or optional feature of the vehicle when manufactured.

In the former after-market embodiment, the assembly is fitted to an attachment arm, preferably having a single arm wrapping over the top of the seat and another arm which passes through the joint provided between the seat base of the adult seat and the seat back of the adult seat. In any event, the object here is to provide a removable method of securely affixing the child's seat and armrest assembly to the adult seat.

Alternatively, the child's seat and armrest assembly may be provided as an original feature of the automobile, and may be included in the vehicle as manufactured as are presently known armrests which fold out pivotably from the seat back when in use. As a further alternative, the child's seat and armrest assembly may be provided as an original feature that is fitted into the base of the seat and which may be elevated at the driver's command. When the child is not present, or when it is not desired that the armrest be used, the assembly, depending on the embodiment, is either lowered into its stowed position or is folded into the seat and out of the way of the driver and passenger.

A bed telescoping between the front of the rear seat and the back of the front seat may be provided. In this embodiment, the front seat back is partially retractable, whereby a person may lie on a portion of the back seat, the telescoping bed, and a portion of the front seat simultaneously. When retracted, the bed is flush with the front side of the rear seat base.

Other advantages and features of the present invention will become more apparent from the following detailed description when read in conjunction with the accompanying drawing.

BRIEF DESCRIPTION OF THE DRAWINGS

The present invention will be more fully understood by reference to the following detailed description of the preferred embodiments of the present invention when read in conjunction with the accompanying drawings, in which like reference characters refer to like parts throughout the views, and in which:

FIG. 3 illustrates a side elevational view showing the assembly of the present invention in its downfolded position and in its raised position as illustrated in shadow lines;

FIG. 4 illustrates an alternate embodiment of the present invention as provided in the automobile as original equipment;

FIG. 7 is a perspective view of the present invention illustrating an infant seated in a child's seat according to the present invention with a harness assembly fitted thereon;

FIG. 8 is the same view as FIG. 7 but without the infant, thereby more clearly illustrating the harness assembly;

DETAILED DESCRIPTION OF THE PREFERRED EMBODIMENTS OF THE PRESENT INVENTION

Figure 1:
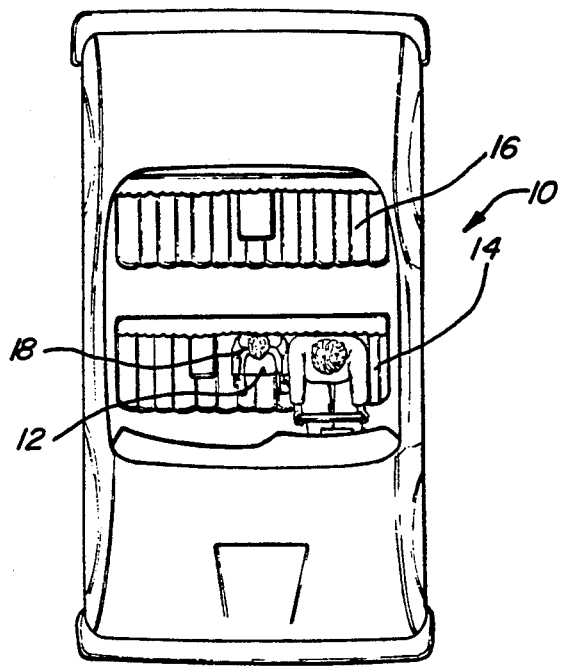
FIG. 1 is a top plan view of an automobile illustrating the approximate positioning of a child in a seat and the driver, each relative to the seats of the vehicle.

The drawing discloses the preferred embodiments of the present invention. While the configurations according to the illustrated embodiments are preferred, it is envisioned that alternate configurations of the present invention may be adopted without deviating from the invention as portrayed. The preferred embodiments are discussed hereafter.

Referring to FIG. 1, an automotive vehicle, generally illustrated as 10, is illustrated. A combination child's seat and armrest assembly 12 is illustrated fitted to a seat 14 of the vehicle 10, but the assembly 12 may be fitted to a rear seat 16 as well, either alternatively or additionally.

The vehicle 10 is illustrated as being an automobile, but the assembly 12 may be provided in other vehicles, such as travel homes or marine vehicles.

As illustrated herein, a child 18 is disposed in the assembly 12 facing forward. This is the preferred positioning, although with some modification it is envisioned that the child 18 may be provided facing rearward (not shown).

Figure 2:
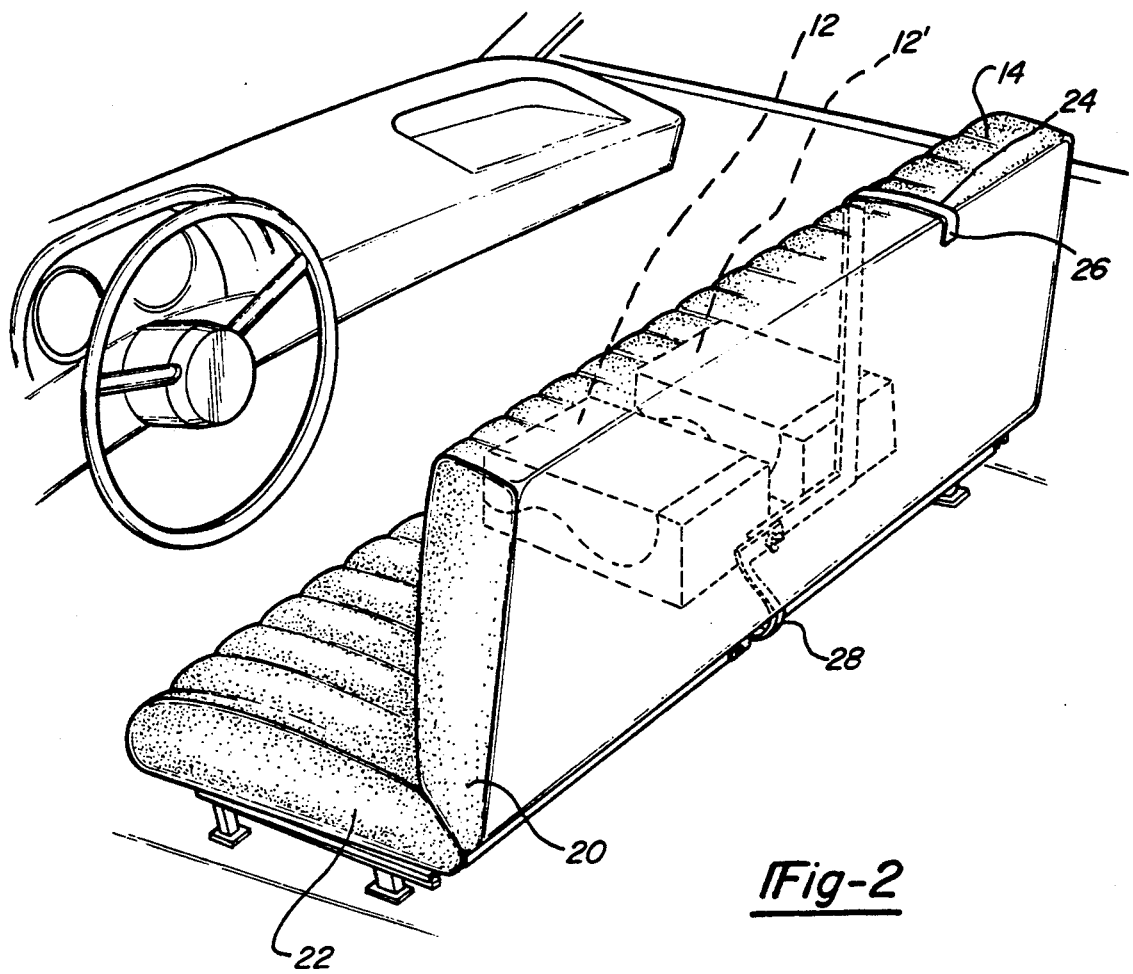
FIG. 2 illustrates a perspective view showing a pair of child's seats and armrest assemblies and their attachment arms situated on the front seat of a passenger vehicle, according to a removable embodiment of the present invention.

Referring to FIG. 2, a pair of assemblies 12, 12' are shown in broken lines in place upon a front seat 14. The assemblies 12, 12' are shown in their lowered positions and thereby serve as armrests or are simply conveniently folded out of the way of a driver.

The seat 14 comprises a seat back 20 and a seat base 22. According to the embodiments of the assemblies 12, 12' illustrated in FIG. 2, the assemblies 12, 12' are characterizable as "after-market" and include an attachment assembly 24 for attachment to the seat 14. The assembly 24 comprises a seat back bracket 26 for removable placement over the seat back 20 and a seat base bracket 28 for removable placement through the space provided between the seat back 20 and the seat base 22. The attachment assembly 24 thus holds the seat and armrest assemblies 12, 12' firmly yet removably in place.

Referring to FIG. 3, a side view of the seat and armrest 12 is illustrated. According to this view, the assembly 12 is shown in its lowered position in solid lines and in its raised position in broken lines.

The assembly 12 is composed of an upper portion 30 and a lower portion 32. The portions 30, 32 are pivotably joined at pivot 34.

The upper portion 30 includes a top side 34 which provides the driver or passenger with an armrest surface and a bottom side 36.

The lower portion 32 includes a top side 38 and a bottom side 40.

As illustrated, the top side 38 of the lower portion 32 is contoured so as to receive a seated child (not shown) substantially within a depressed area 42. The lower portion 32 includes a back end 44 that is provided to give support to the child passenger's back.

As best illustrated in broken lines, the bottom side 36 of the upper portion 30 includes a protruding portion 46 which provides chest support for the child passenger.

The bottom side 36 of the upper portion 30 is configured to be mated with the top side 38 of the lower portion 32 upon lowering of the upper portion 30 to its arm rest position.

With reference to FIG. 4, an alternate embodiment of the present invention is illustrated. This view reveals a seat and armrest assembly 48 permanently fixed to the seat back 20'. According to this embodiment, the assembly 48 is pivotably mounted in the seat back 20' and is pivotable at pivot point 50. This construction allows the driver to move the assembly 48 out of the way and into a recess provided in the seat back 20'.

Figure 5:
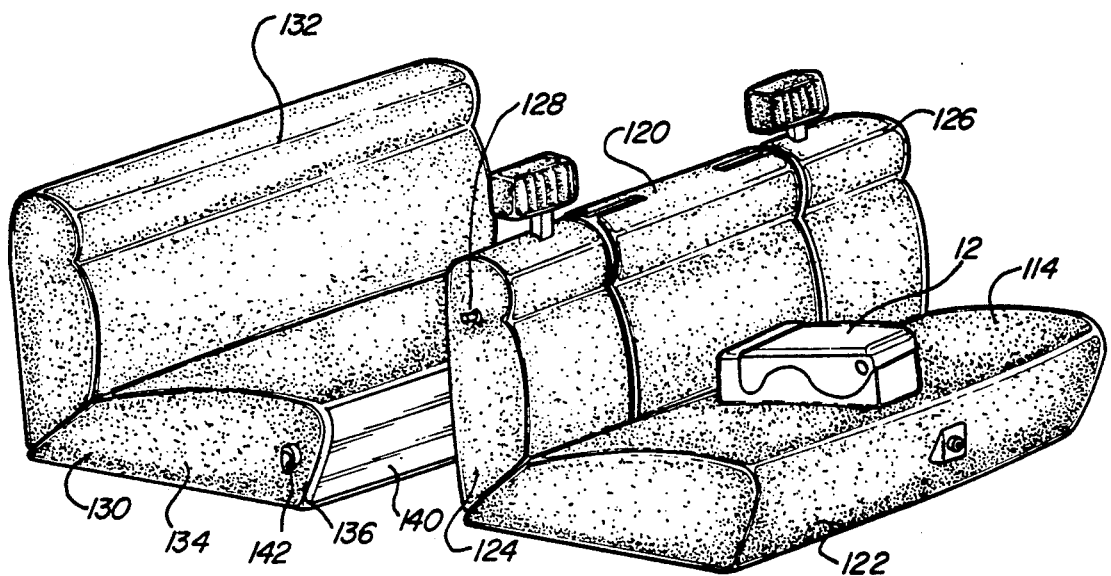
FIG. 5 is a perspective view of front and rear passenger seats according to the present invention having telescoping front seat back portions and a bed portion.

Referring to FIG. 5, an alternate embodiment of the present invention is illustrated and shows the armrest assembly 12 fitted to a front seat 114. The front seat includes a seat back 120 and a seat base 122. The back 120 includes a first telescoping section 124 and a second telescoping section 126. A button 128 unlocks the first telescoping section 124 so that it may be moved to its retracted position (shown in FIG. 6).

A rear seat 130 is provided and includes a seat back 132 and a seat base 134. The seat base 134 includes a seat base front 136 that includes a bed portion 140 pivotably attached thereto. A bed release lever 142 is fitted to allow the bed portion 140 to be released for use.

Figure 6:
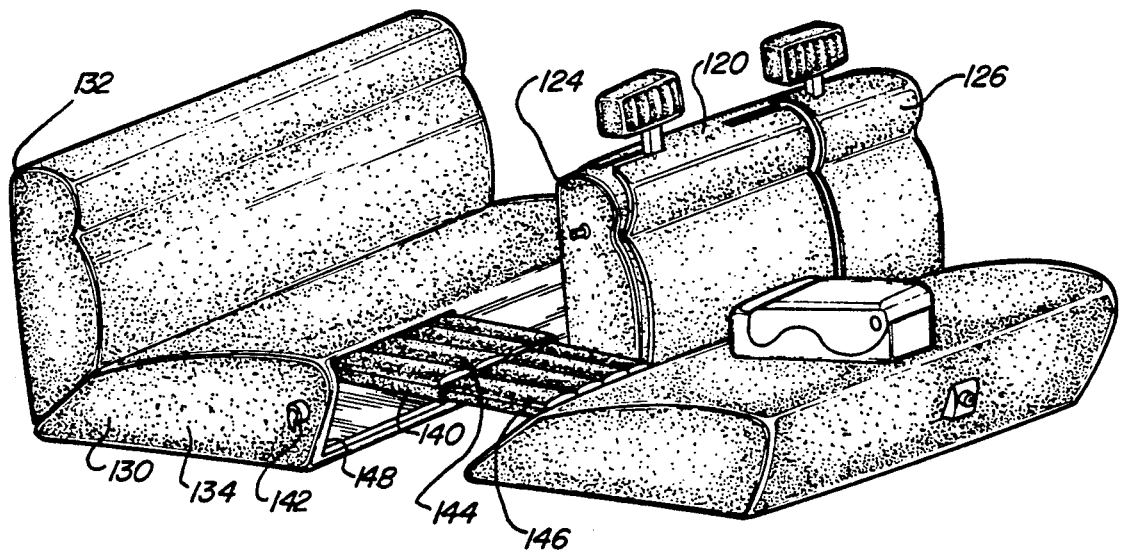
FIG. 6 is the same view as that of FIG. 5 illustrating the seat back of the front seat in its retracted position and the bed in its extended position.

Referring to FIG. 6, the view of FIG. 5 is illustrated, but the view here illustrates the first telescoping section 124 in its retracted position within the seat back 120. The bed portion 140 is shown in its extended position whereby it is extended between the base 134 of the rear seat 130 and the base 122 of the front seat 114.

The bed portion 140 is preferably comprised of a first telescoping member 144 and a second telescoping member 146. Both members 144 and 146 include padding disposed on the top sides thereof.

To accomodate the bed portion 140 in its folded away position (shown in FIG. 5), the front side 136 of the rear seat base 130 includes a compartment 148 defined therein for removably receiving the bed portion 140.

Of course, the bed portion 140 may be comprised of more or less than the two members 144, 146, and may include members that are hingedly (rather than telescopingly) interattached.

Referring now to FIG. 7, an infant, generally indicated as 60, is illustrated seated in the lower portion 32. A harness assembly 62 is fitted about the torso of the infant 60. The harness assembly 62 provides lateral support in the event of an accident, back support being provided by the back end 44 of the lower portion 32 and front support being provided by the bottom side 36 of the upper portion 30 (see FIG. 3).

FIG. 8 illustrates the harness assembly 62 without the infant in position. The harness assembly comprises a torso belt 64 having a first end 66 and a second end 68. The first end 66 and the second end 68 are releasably interattachable, preferably by means of hook and loop fasteners as shown. The ends 66, 68 are situated at the side of the baby, or close to the driver but out of the reach of the infant.

The torso belt 64 is fitted to the depressed area 42 by a vertical belt 70. While the belt 64 may be composed of a flexible fabric, the vertical belt is flexible only at the point of attachment to the depressed area 42. This construction allows the harness assembly to be folded up when not in use and to be disposed substantially between the depressed area 42 and the bottom side 36 when the upper portion 30 is in its down-folded position.

Figure 9:
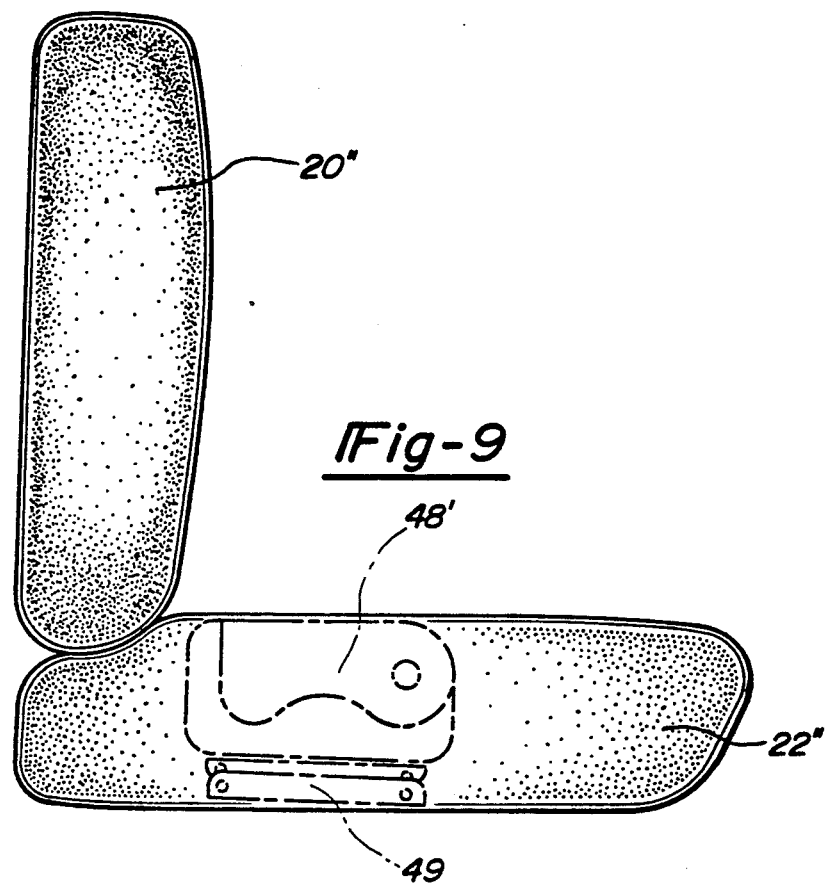
FIG. 9 is an alternate embodiment of the present invention revealing the armrest stowed in the seat base.

FIG. 9 discloses an alternate embodiment of the armrest construction according to the present invention. According to this embodiment, there is a seat back 20" connected with a seat base 22". A seat and armrest assembly 48' is shown in broken lines disposed within the seat base 22". Although other mechanisms for raising the assembly 48' may be employed, a scissors bracket 49 interconnects the seat base 22" with the underside of the assembly 48'.

Figure 10:
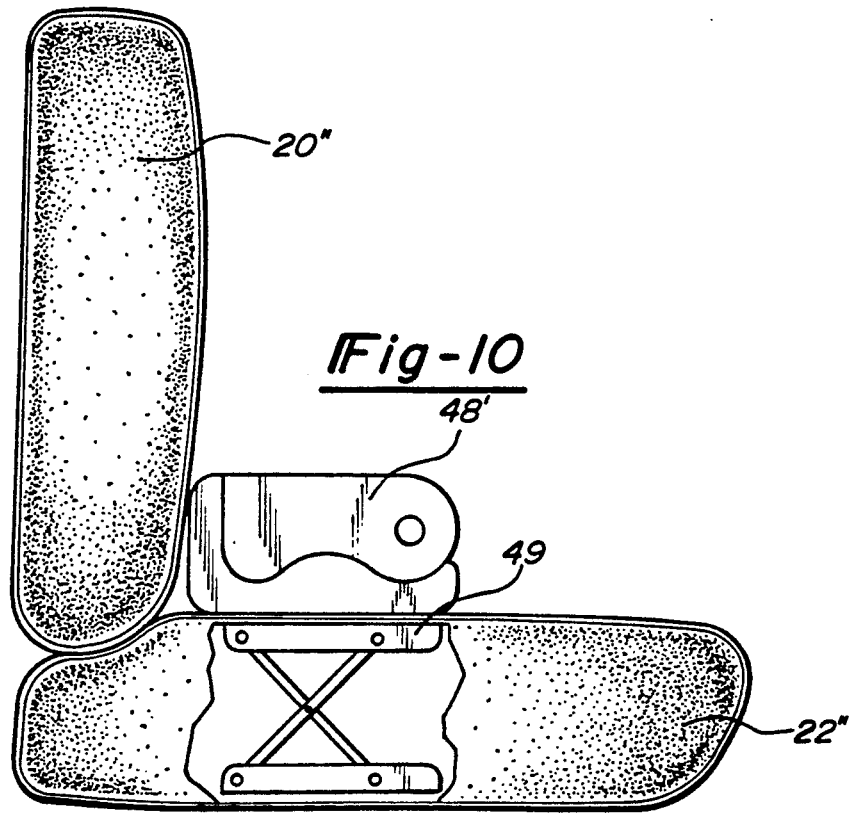
FIG. 10 is similar to the view of FIG. 9 except showing the armrest in its elevated position.

FIG. 10 illustrates the assembly 48' in its elevated position. As may be seen, the bracket 49 is in its extended position.

Having described my invention, however, many modifications thereto will become apparent to those skilled in the art to which it pertains without deviation from the spirit of the invention as defined by the scope of the appended claims.

I claim:

1. A combination vehicle seat and child's support and armrest assembly, said seat having a back and a base, said combination comprising:

said armrest assembly having an upper portion and a lower portion, said upper portion having a top side and a bottom side, said bottom side of said upper portion having a rear surface and an adjacent intermediate surface;

said upper portion being selectively movable from a lowered downfolded position to a raised position;

said bottom side of said upper portion further including a protruding chest support, said rear surface of said bottom side of said upper portion being provided on said protruding chest support, said rear surface comprising a chest-contacting region for contacting the chest of a child-passenger, whereby the chest of the child-passenger's body is supported by said chest-contacting region when said upper portion is in said raised position;

said upper portion having an inconstant width between said top side and said bottom side, the width between said top side and said rear surface being greater than the width between said top side and said adjacent intermediate surface.

2. The combination of claim 1 wherein said assembly is pivotably mounted to said seat.

3. The combination of claim 1 wherein said lower portion includes a front region, said upper portion being pivotably fitted to said front region;

said lower portion further including a back side, a top side, and a bottom side;

said movable upper portion having a front region;

said top side of said upper portion being substantially parallel with said base of said seat when in said lowered downfolded position, and said top side of said upper portion being substantially perpendicular with said base of said seat when in said raised position.

4. The combination of claim 3 wherein said top side of said lower portion has defined therein a depression for accommodating a seated child; and said protruding support substantially conforming to said depression of said top side of said lower portion, whereby said top side of said lower portion and said bottom side of said upper portion are substantially mated when said upper portion is in said lowered downfolded position.

5. The combination of claim 4 wherein said lower portion includes a back wall elevated from said top side of said lower portion whereby back support for said child is provided.

6. A combination vehicle seat and child's support and armrest assembly, said seat having a back and a base, said combination comprising:

said armrest assembly having a lower portion and an upper portion;

said lower portion having a top side, a front region, a back side, and a bottom side, said top side having a front surface, a back surface, and an intermediate surface disposed therebetween;

said back side and said bottom side of said lower portion being respectively abuttable with said back and base of said seat;

said upper portion pivotably fitted to said front region of said lower portion, said upper portion having a top side, a front region, and a bottom side, said bottom side of said upper portion having a front surface, a back surface, and an intermediate surface disposed therebetween;

said upper portion being selectively movable from a lowered downfolded position wherein said top side of said upper portion is substantially parallel with said base of said seat to a raised position for seating of a child-passenger wherein said top side of said upper portion is substantially perpendicular to said base of said seat;

said back surface of said bottom side of said upper portion further defining a protruding chest support, said chest support having a chest-contacting region for contacting the chest of a child-passenger, whereby the chest of the child-passenger's body is supported by said protruding chest support when said upper portion is in said raised position;

said front surface of said bottom side of said upper portion defining a bottom side protrusion, said intermediate surface of said bottom side of said upper portion defining a depressed region with respect to said protruding chest support and said bottom side protrusion; and said intermediate surface of said top side of said lower portion defining a top side protrusion, said front surface and said back surface of said top side of said lower portion defining depressed regions with respect to said top side protrusion, whereby said bottom side of said upper portion and said top side of said lower portion are substantially mated when said upper portion is in said lowered downfolded position.

7. The combination of claim 6 wherein said front region of said lower portion is pivotably fitted to said front region of said upper portion.

8. The combination of claim 6 wherein:

said lower portion includes a back wall elevated above said top side of said lower portion whereby back support for said seated child is provided.

9. The combination of claim 6 further including a restraining belt fitted thereto.

10. The combination of claim 9 wherein said restraining belt comprises a belt portion and an intermediate portion, said belt portion being fitted to said intermediate portion and said intermediate portion being fitted to said top side of said lower portion.

* * * * *